United States Patent
Su

(10) Patent No.: US 9,770,955 B2
(45) Date of Patent: Sep. 26, 2017

(54) LOCK FOR SECURING TRAILER HITCH

(71) Applicants: Wen-Chun Su, Taichung (TW); HI POWER LOCK CO., LTD., Tainan (TW); MILENCO LIMITED, Milton Keynes (GB)

(72) Inventor: Wen-Chun Su, Taichung (TW)

(73) Assignees: Wen-Chun Su, Taiching (TW); Hi Power Lock Co., Ltd., Tainan (TW); Milenco Limited, Milton Keynes (GB)

( * ) Notice: Subject to any disclaimer, the term of this patent is extended or adjusted under 35 U.S.C. 154(b) by 0 days.

(21) Appl. No.: 15/134,794

(22) Filed: Apr. 21, 2016

(65) Prior Publication Data

US 2016/0229241 A1 Aug. 11, 2016

Related U.S. Application Data

(63) Continuation-in-part of application No. 14/548,763, filed on Nov. 20, 2014, now abandoned.

(30) Foreign Application Priority Data

Sep. 23, 2014 (TW) .............................. 103132763 A

(51) Int. Cl.
*B60D 1/60* (2006.01)
(52) U.S. Cl.
CPC ..................... *B60D 1/60* (2013.01)
(58) Field of Classification Search
CPC ...................................................... B60D 1/60
USPC ...................................................... 280/507
See application file for complete search history.

(56) References Cited

U.S. PATENT DOCUMENTS

| 5,664,445 A * | 9/1997 | Chang ................... E05B 67/365 70/34 |
| 2002/0104338 A1* | 8/2002 | Koy ........................ B60D 1/52 70/34 |
| 2007/0137266 A1* | 6/2007 | Hsai ........................ B60D 1/60 70/34 |
| 2012/0212000 A1* | 8/2012 | Wen Chun ............... B60D 1/02 292/164 |

* cited by examiner

*Primary Examiner* — Jacob Knutson
*Assistant Examiner* — Felicia L Brittman
(74) *Attorney, Agent, or Firm* — Rosenberg, Klein & Lee

(57) ABSTRACT

A lock for securing a trailer hitch includes a latching member, a position-limiting assembly, and a housing. The position-limiting assembly includes first and second position-limiting members, a magnetic member, and a securing pin. The first position-limiting member is configured for detachable engagement with the latching member. The second position-limiting member is mounted in the housing, receives the magnetic member, and is slidably connected to the first position-limiting member via the securing pin in order to be moved to an engaged position and a disengaged position. When at the engaged position, the second position-limiting member is mounted to the latching member due to the magnetic member and thereby fixes the first position-limiting member in position. When at the disengaged position, the second position-limiting member is separate from an end portion of the latching member to allow detachment of the first position-limiting member from the latching member.

6 Claims, 11 Drawing Sheets

LOCK FOR SECURING TRAILER HITCH

CROSS-REFERENCE TO RELATED APPLICATIONS

This application is a continuation in part of U.S. application Ser. No. 14/548,763 filed on Nov. 20, 2014, currently pending.

BACKGROUND OF THE INVENTION

1. Technical Field

The present invention relates to a lock for securing a trailer hitch and more particularly to a lock whose components can be easily disassembled (disengaged from one another) and reassembled (reengaged with one another).

2. Description of Related Art

It is now common practice to attach a trailer to the rear of a vehicle via a coupler and a securing assembly so that there is more space for carrying people and/or goods. Such securing assemblies are well known in the art. For example, US Patent Application Publication No. 20120212000 "Trailer lock", U.S. Pat. No. 6,364,339 "Trailer hitch and lock assembly", and U.S. Pat. No. 6,402,181 "Trailer hitch and lock assembly" disclose, in essence, a latching member and a lock. The latching member is configured to be passed through a trailer coupler. More specifically, the latching member has an end portion passing through the trailer coupler and provided with an engaging portion. The lock has a mounting hole, an engaging member, and a keyhole. The end portion of the latching member is enclosed in the mounting hole. A key can be inserted into the keyhole and turned to drive the engaging member into engagement with the engaging portion, thereby locking the latching member.

The prior art cited above, however, leaves room for improvement. First and foremost, the lock must be locked and unlocked with a key, which leads to complexity in operation and hence inconvenience. Second, the numerous components and complicated structure of the lock hinder manufacture and assemble, making it difficult to lower production cost, let alone product price.

There are also securing structures without a lock core. For example, Taiwan Patent No. M274264 "Lock for a vehicle towing hitch" essentially discloses a latching member with an engaging bar and a spring. The spring can push a locking block into engagement with the engaging bar such that the locking block and the latching member are fixed in position. Since this latching member is no ordinary latching member and must be equipped with the engaging bar and the spring, the cost of the end product would be high.

BRIEF SUMMARY OF THE INVENTION

In order to provide a trailer hitch securing assembly which is not only structurally simple but also applicable to standard latching members for use with trailer hitches, the inventor of the present invention conducted extensive research and experiment and finally succeeded in developing a lock for securing a trailer hitch as disclosed herein. The lock includes a latching member, a position-limiting assembly, and a housing. The latching member is configured to extend through the trailer hitch and has an end portion and a fitting groove in the end portion. The position-limiting assembly includes a first position-limiting member, a second position-limiting member, a magnetic member, and a securing pin. The first position-limiting member is configured to prevent the latching member from separating from the trailer hitch and has a fitting portion and an extension portion. The fitting portion defines a fitting space and an opening in communication with the fitting space so that the fitting groove of the latching member can be placed into the fitting space of the first position-limiting member through the opening, thereby bringing the latching member and the first position-limiting member into detachable engagement. The extension portion has a slide groove. The second position-limiting member has one end defining an accommodating space. The accommodating space corresponds to the end portion of the latching member. The opposite end of the second position-limiting member defines a receiving groove, in which the magnetic member is mounted. The second position-limiting member is slidably connected to the slide groove of the first position-limiting member by the securing pin in order to be moved to an engaged position and a disengaged position. When at the engaged position, the second position-limiting member is secured to the latching member by the magnetic member; as a result, the first position-limiting member is fixed in position, and the end portion of the latching member is enclosed in the accommodating space of the second position-limiting member. When the second position-limiting member is at the disengaged position, the end portion of the latching member is separate from the accommodating space of the second position-limiting member, allowing the first position-limiting member to be detached from the latching member. The housing defines a receiving space for receiving the second position-limiting member, is connected to the second position-limiting member by the securing pin, and has a projecting portion. The projecting portion is located in the receiving space and is configured to be pressed against the magnetic member.

The lock described above for securing the trailer hitch may further include a pressing assembly which is mounted in the receiving space of the housing and includes an elastic member and an engaging member. The elastic member is compressed between the housing and the engaging member. While the second position-limiting member is moved to the engaged position, the elastic member applies an elastic force to the engaging member. The elastic force causes the engaging member to engage with the first position-limiting member, thereby securing the second position-limiting member at the engaged position. Once the engaging member overcomes the elastic force and separates from the first position-limiting member, the second position-limiting member is allowed to move from the engaged position to the disengaged position.

Preferably, the extension portion has a stop edge adjacent to the slide groove, and the engaging member includes an engaging portion. The engaging portion has a guide surface and a stop surface. The guide surface corresponds to an end surface of the extension portion of the first position-limiting member while the stop surface faces away from the guide surface. After the guide surface of the engaging member moves past the end surface of the extension portion, the stop surface of the engaging member enters the slide groove and consequently faces the stop edge.

Preferably, the housing has a through hole in communication with the receiving space, and the engaging member includes a pushing portion jutting out of the through hole of the housing. The pushing portion has a first extension length less than or equal to the diameter of the through hole. The engaging member has a second extension length greater than the diameter of the through hole.

Preferably, the elastic member is a spring, the engaging member has a groove, and the spring has one end mounted in the groove.

The foregoing technical features have the following advantages:

1. The movably connected first and second position-limiting members of the position-limiting assembly only have to be secured sequentially to the latching member to enter the engaged state, and locking and unlocking can be done without a lock core and a matching key. The lock of the present invention is therefore more convenient, structurally simpler, and less costly than its conventional counterparts.

2. As the position-limiting assembly can be used with standard latching members, the present invention has wide applicability.

3. Since the position-limiting assembly is secured in place by magnetic attraction, the securing effect is less susceptible to dust or dirt in the environment than in the prior art.

4. The engaging member can be movably pressed against the first position-limiting member to better secure the second position-limiting member at the engaged position and prevent the second position-limiting member from moving to the disengaged position directly. Thus, the danger associated with inadvertent unlocking is avoided.

DETAILED DESCRIPTION OF THE INVENTION

The present invention incorporates the foregoing technical features into a lock for securing a trailer hitch, and the major effects of the lock are detailed below with reference to some illustrative embodiments.

Figure 1:
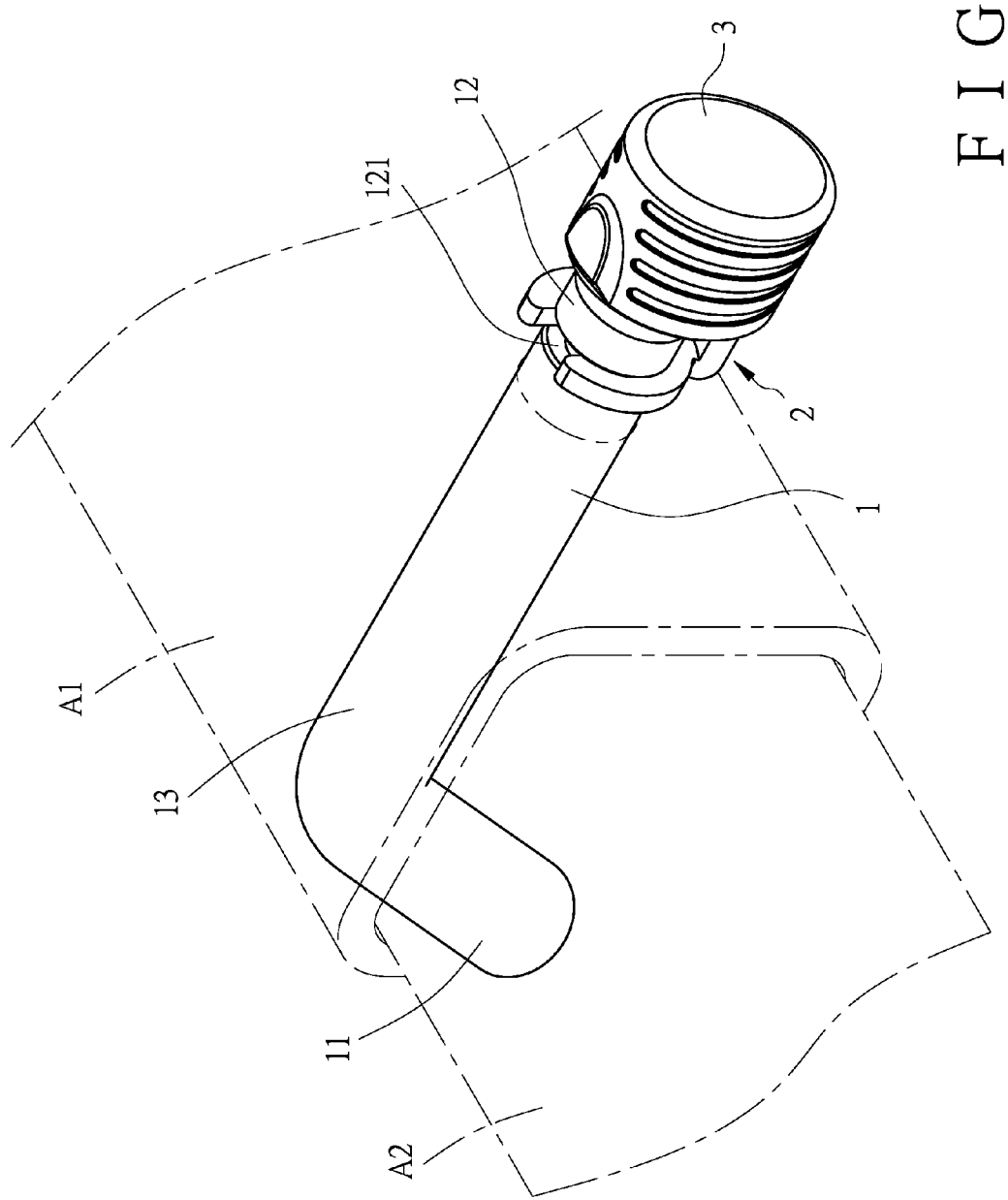
FIG. 1 is an assembled perspective view of a first embodiment of the present invention.

Referring to FIG. 1, the lock for securing a trailer hitch according to the first embodiment of the present invention includes a latching member 1, a position-limiting assembly 2, and a housing 3. The latching member 1 is configured to be passed through a trailer hitch A2, or more specifically to be passed through a receiver tube A1 at the rear of a vehicle as well as the trailer hitch A2. The latching member 1 is made of iron or an iron alloy, for example. The latching member 1 has a stop portion 11, an end portion 12, and a body portion 13 connecting the stop portion 11 and the end portion 12. The latching member 1 further has a fitting groove 121 in the end portion 12.

Figure 2:
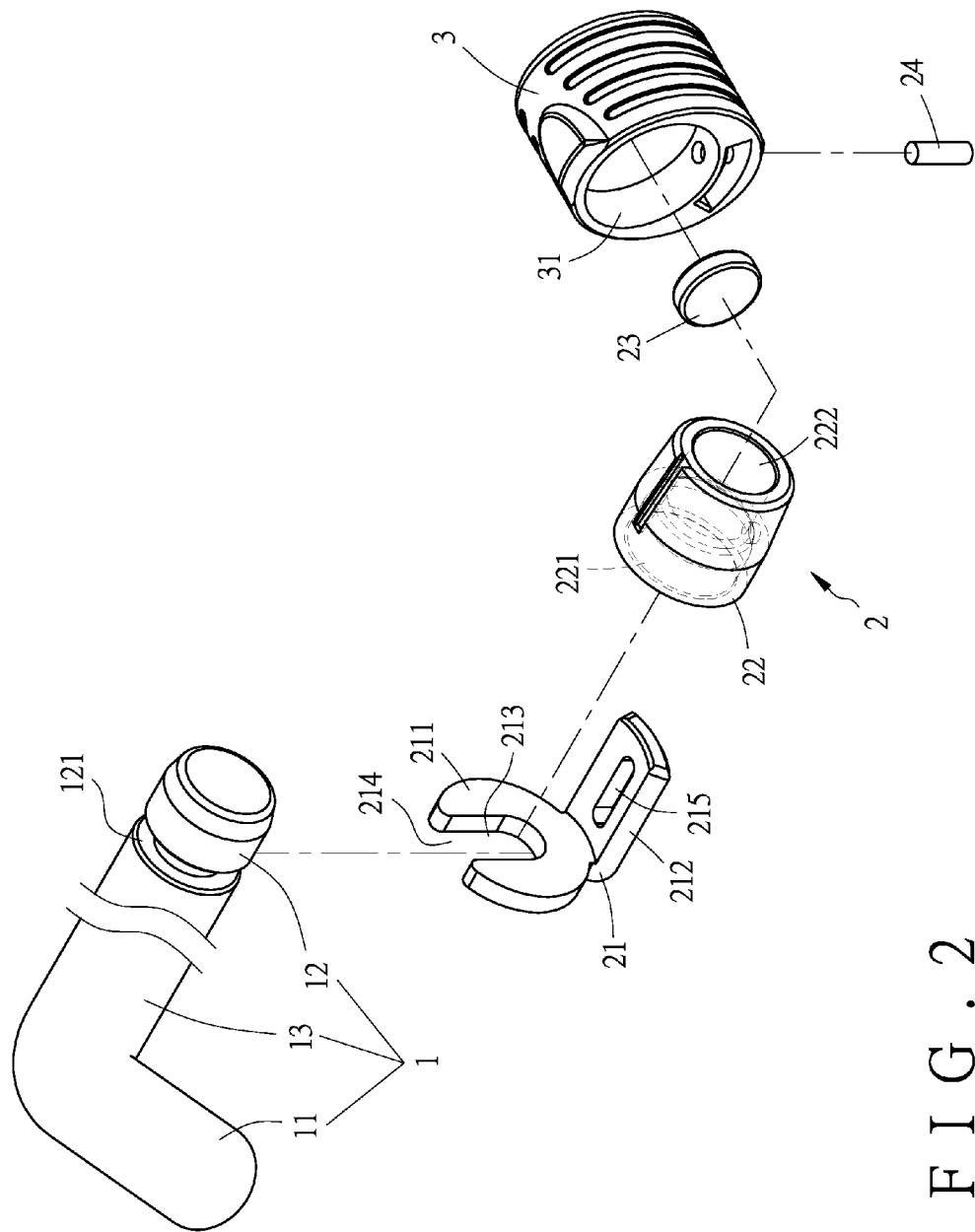
FIG. 2 is an exploded perspective view of the first embodiment of the present invention.
Figure 3:
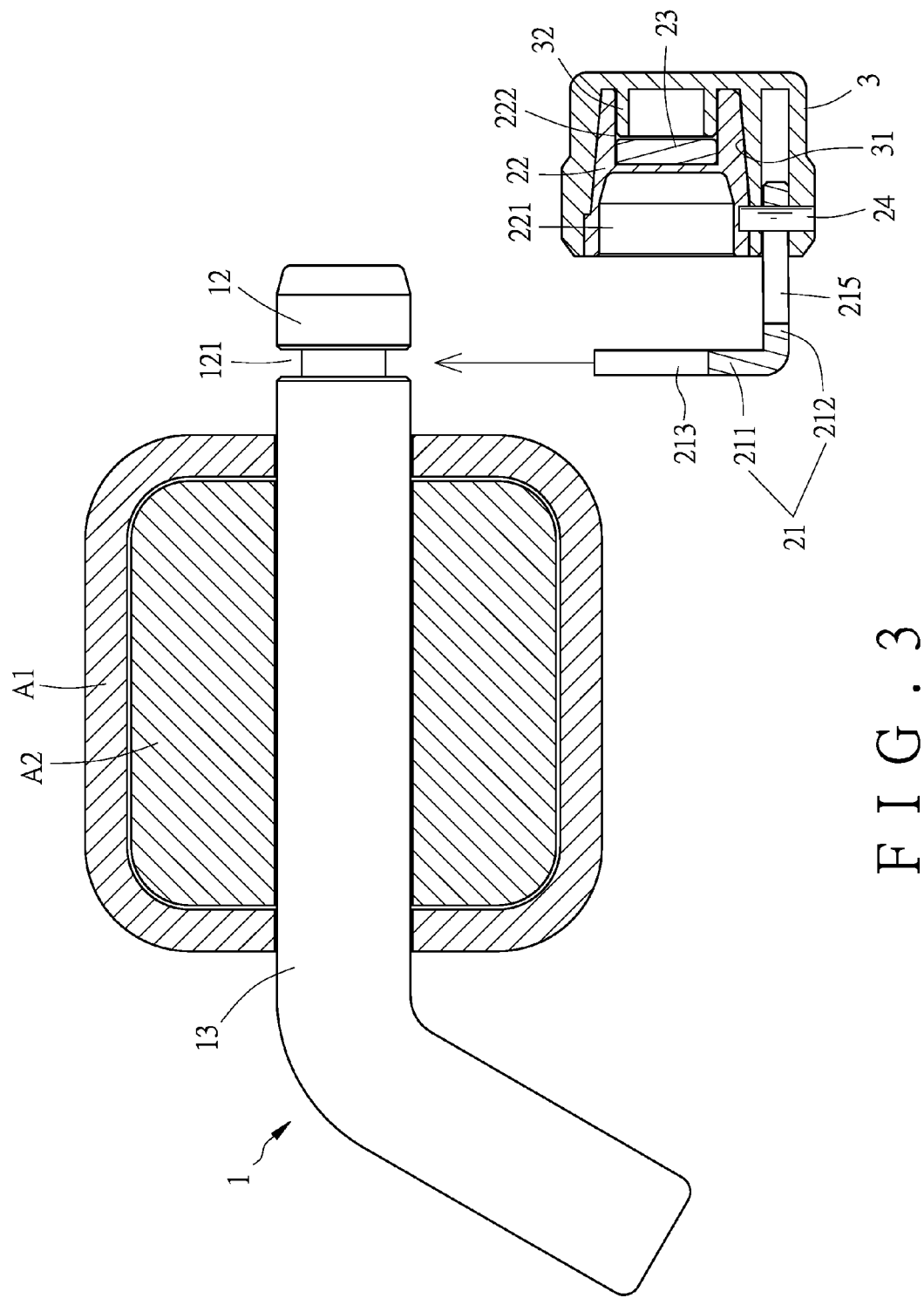
FIG. 3 is a sectional view showing a state of use of the first embodiment of the present invention.

Referring to FIG. 2 and FIG. 3, the position-limiting assembly 2 includes a first position-limiting member 21, a second position-limiting member 22, a magnetic member 23, and a securing pin 24. The first position-limiting member 21 has a fitting portion 211 and an extension portion 212 connected to the fitting portion 211. The fitting portion 211 defines a fitting space 213 and an opening 214 in communication with the fitting space 213 so that the fitting groove 121 of the latching member 1 can be placed into the fitting space 213 of the first position-limiting member 21 through the opening 214, thereby mounting the first position-limiting member 21 to the latching member 1. The extension portion 212 has a slide groove 215.

With continued reference to FIG. 2 and FIG. 3, the second position-limiting member 22 has one end defining an accommodating space 221. The accommodating space 221 corresponds to the end portion 12 of the latching member 1. The other end of the second position-limiting member 22 defines a receiving groove 222, and the magnetic member 23 is mounted in the receiving groove 222. The second position-limiting member 22 is slidably connected to the slide groove 215 of the first position-limiting member 21 via the securing pin 24.

With continued reference to FIG. 2 and FIG. 3, the housing 3 defines a receiving space 31 for receiving the second position-limiting member 22. The housing 3 is connected to the second position-limiting member 22 by the securing pin 24 and has a projecting portion 32. The projecting portion 32 is located in the receiving space 31 and is configured to be pressed against the magnetic member 23 so that the magnetic member 23 is securely positioned in the receiving groove 222 of the second position-limiting member 22.

Figure 4:
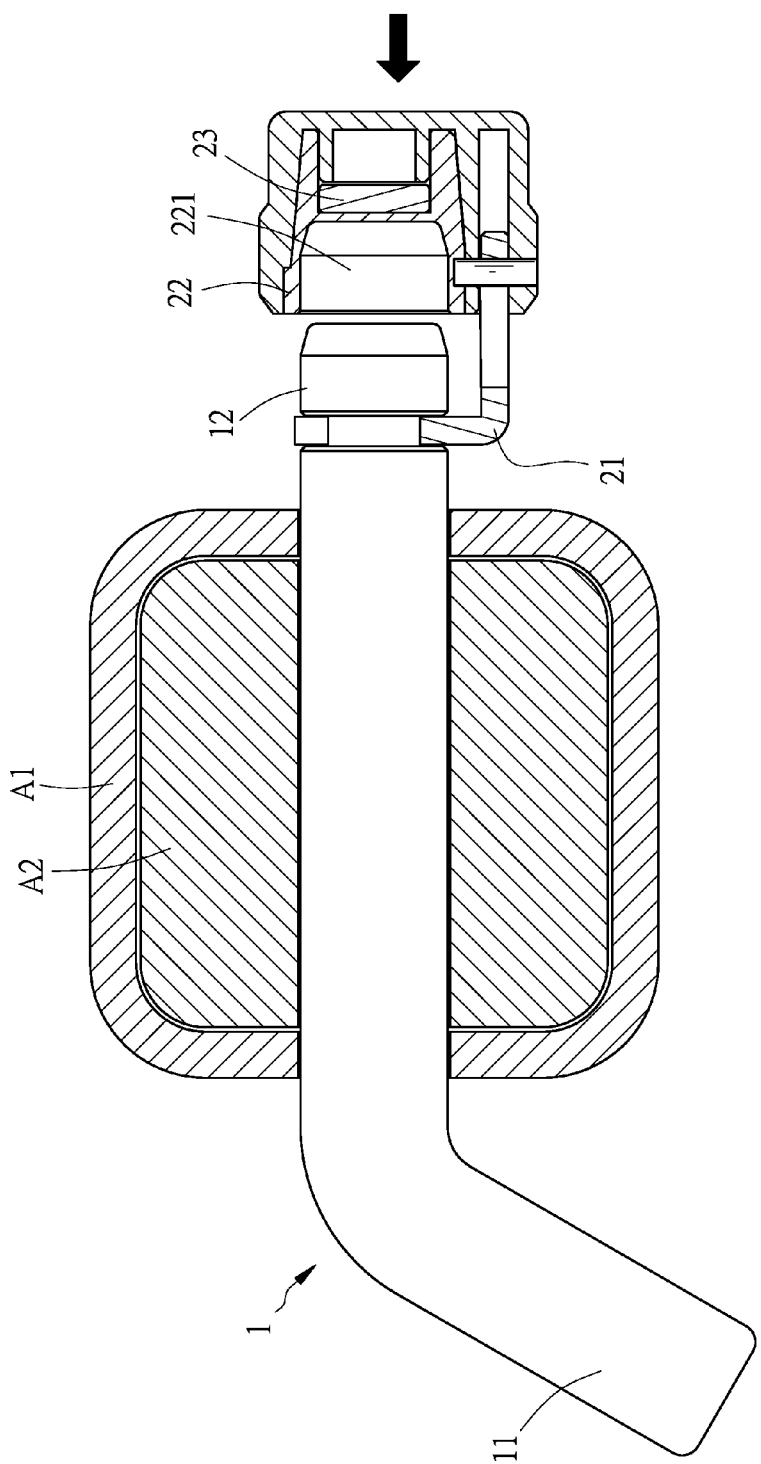
FIG. 4 is a sectional view showing another state of use of the first embodiment of the present invention.
Figure 5:
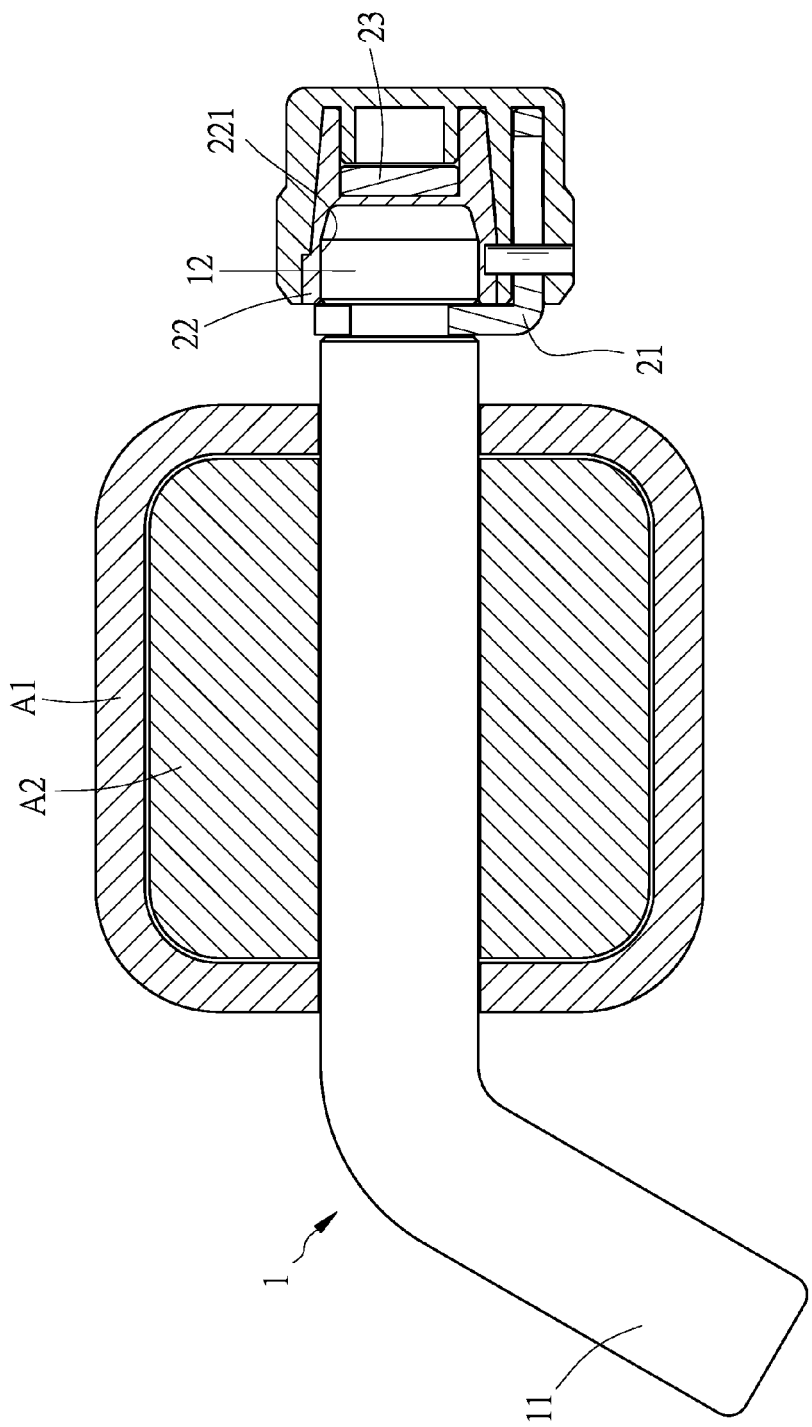
FIG. 5 is a sectional view showing yet another state of use of the first embodiment of the present invention.
Figure 6:
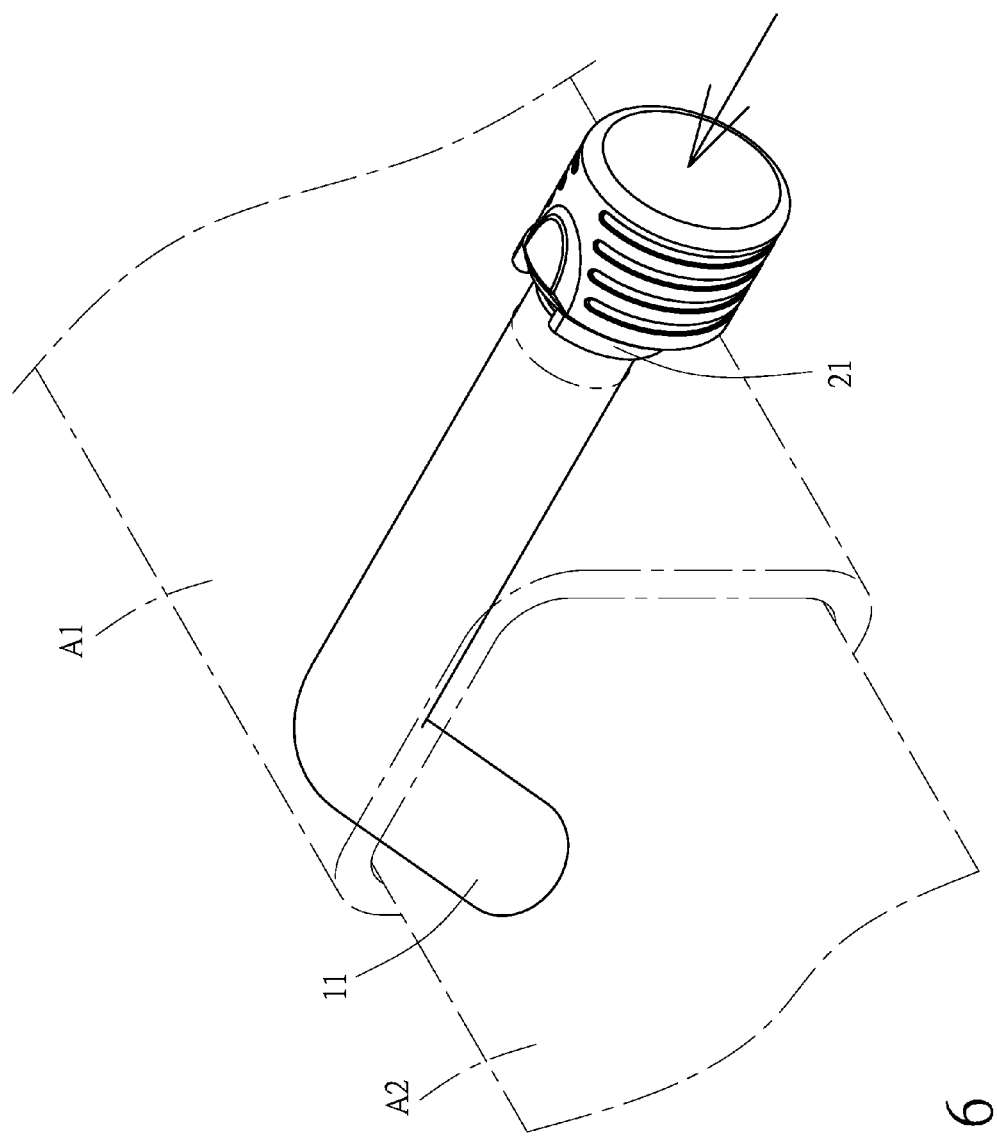
FIG. 6 is a perspective view of the first embodiment of the present invention, showing the position-limiting assembly in the engaged state.

To secure the latching member 1 to the receiver tube A1 and the trailer hitch A2, referring to FIG. 3 and FIG. 4, the body portion 13 of the latching member 1 is passed through the receiver tube A1 and the trailer hitch A2 until the end portion 12 of the latching member 1 juts out of the receiver tube A1 and the trailer hitch A2. Then, the fitting portion 211 of the first position-limiting member 21 is fitted into the fitting groove 121 in the end portion 12. After that, referring to FIG. 4 and FIG. 5, the second position-limiting member 22 is manually displaced toward the end portion 12 of the latching member 1 (in the meantime, the second position-limiting member 22 is displaced also by magnetic attraction of the magnetic member 23). With the assistance of the magnetic attraction of the magnetic member 23, the accommodating space 221 of the second position-limiting member 22 encloses the end portion 12 of the latching member 1 and is thus fixed at an engaged position. As the second position-limiting member 22 is connected to the first position-limiting member 21, the first position-limiting member 21 is also fixed in position once the second position-limiting member 22 is in place. The first position-limiting member 21 and the stop portion 11 provided respectively at the two ends of the latching member 1 jointly prevent the latching member 1 from separating from the receiver tube A1 and the trailer hitch A2 (see FIG. 6).

For disengagement, referring back to FIG. 4, the second position-limiting member 22 is pushed in the opposite direction. Once the pushing force overcomes the magnetic attraction of the magnetic member 23, the second position-limiting member 22 can be displaced to a disengaged position, where the second position-limiting member 22 is separate from the end portion 12 of the latching member 1.

As the first position-limiting member 21 is fixed in position only when the second position-limiting member 22 is secured to the latching member 1, disengagement of the second position-limiting member 22 from the end portion 12 of the latching member 1 makes it possible to detach the first position-limiting member 21 from the latching member 1.

Figure 7:
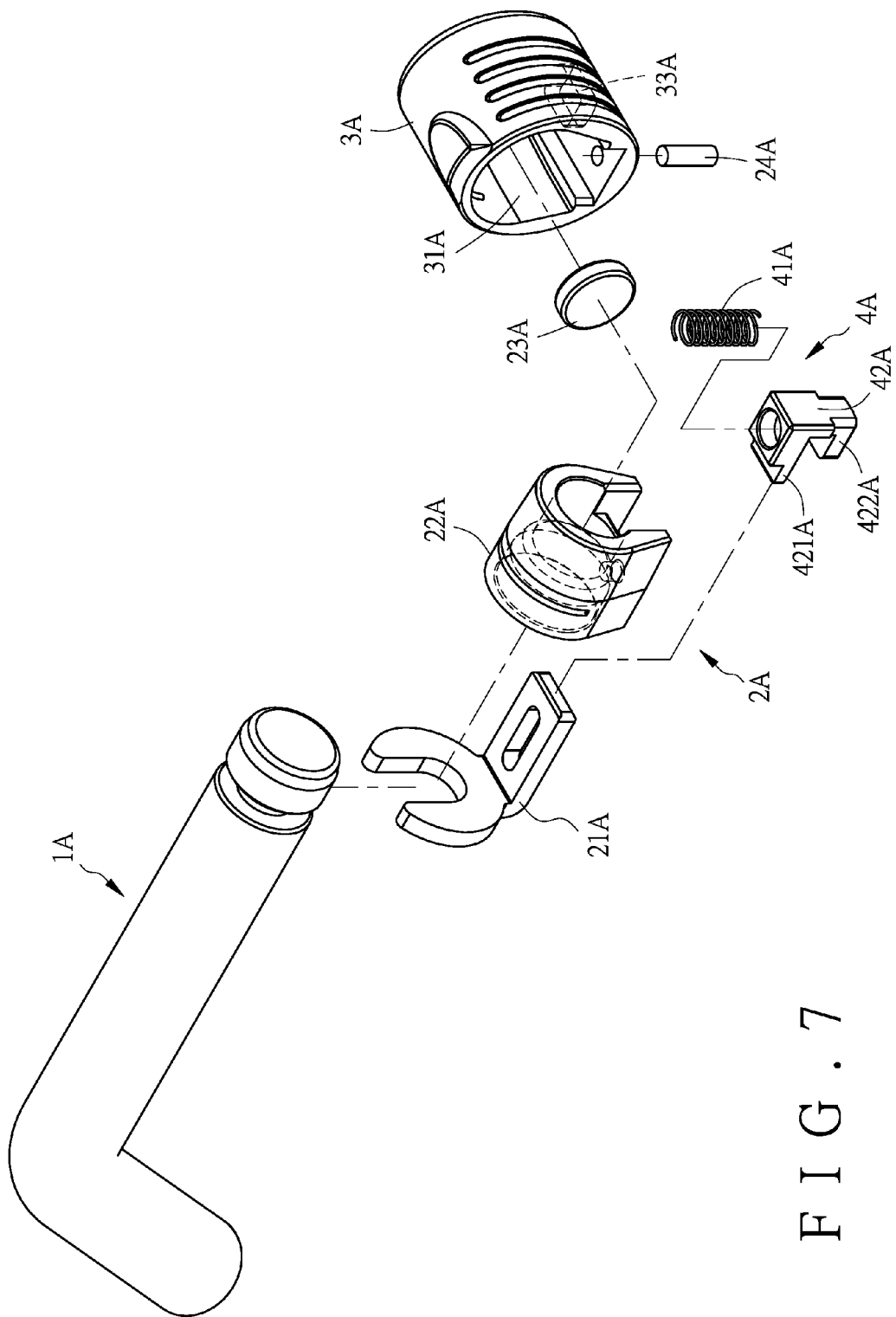
FIG. 7 is an exploded perspective view of the second embodiment of the present invention.

FIG. 7 shows the second embodiment of the present invention, which is similar to the first embodiment in that it also includes a latching member 1A, a position-limiting assembly 2A, and a housing 3A, and that the position-limiting assembly 2A also includes a first position-limiting member 21A, a second position-limiting member 22A, a magnetic member 23A, and a securing pin 24A. The second embodiment is different from the first embodiment mainly in that the housing 3A further has a through hole 33A on one side, that the through hole 33A is in communication with the receiving space 31A of the housing 3A, and that the lock further includes a pressing assembly 4A.

Figure 8:
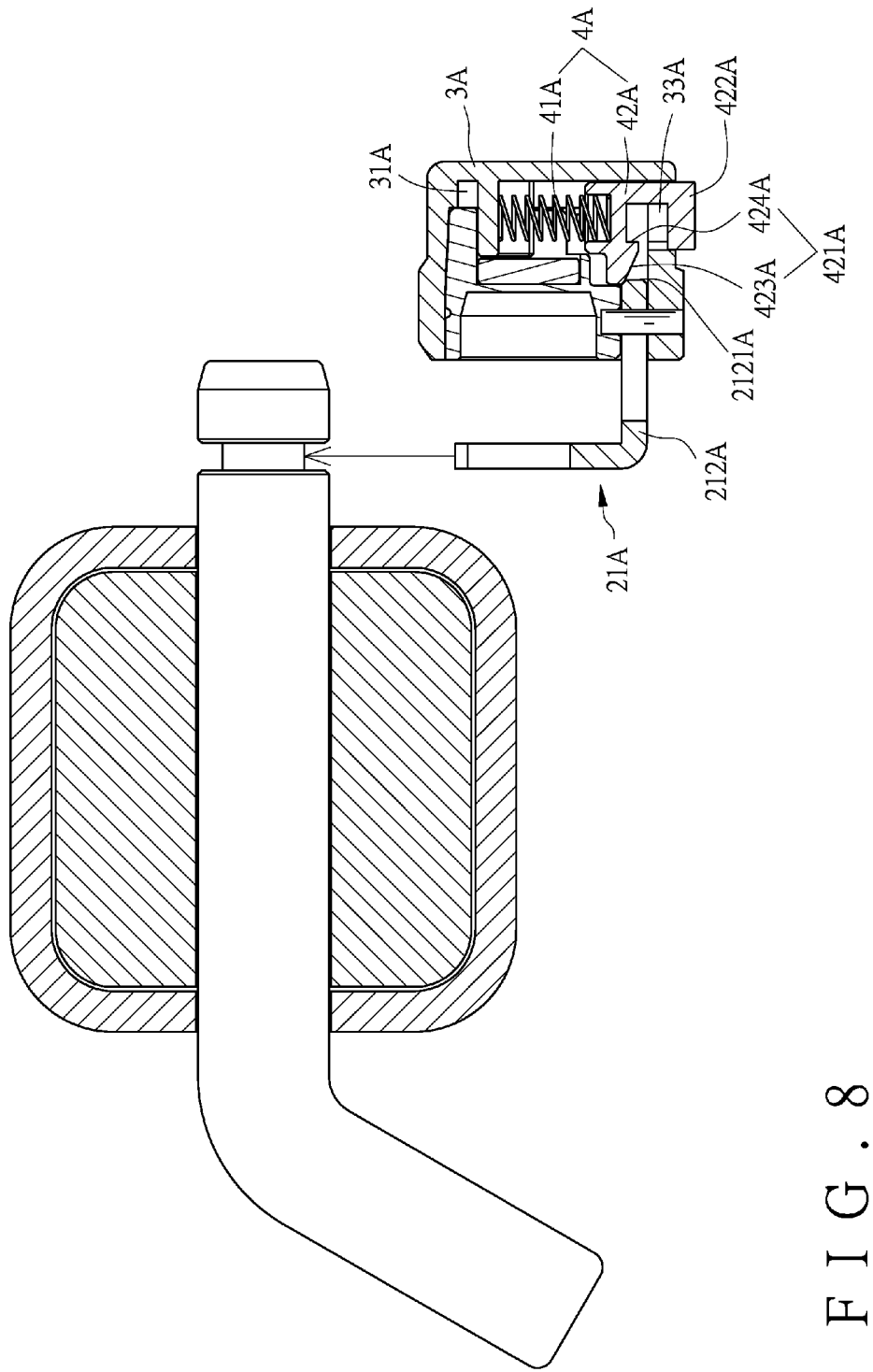
FIG. 8 is a sectional view showing a state of use of the second embodiment of the present invention.

Referring to FIG. 7 and FIG. 8, the pressing assembly 4A is mounted in the receiving space 31A of the housing 3A and includes an elastic member 41A and an engaging member 42A. The elastic member 41A is compressed between the housing 3A and the engaging member 42A. The engaging member 42A includes an engaging portion 421A and a pushing portion 422A opposite the engaging portion 421A. The engaging portion 421A has a guide surface 423A and a stop surface 424A. The guide surface 423A corresponds to an end surface 2121A of an extension portion 212A of the first position-limiting member 21A. The stop surface 424A faces away from the guide surface 423A. The pushing portion 422A extends out of the through hole 33A of the housing 3A.

Figure 9:
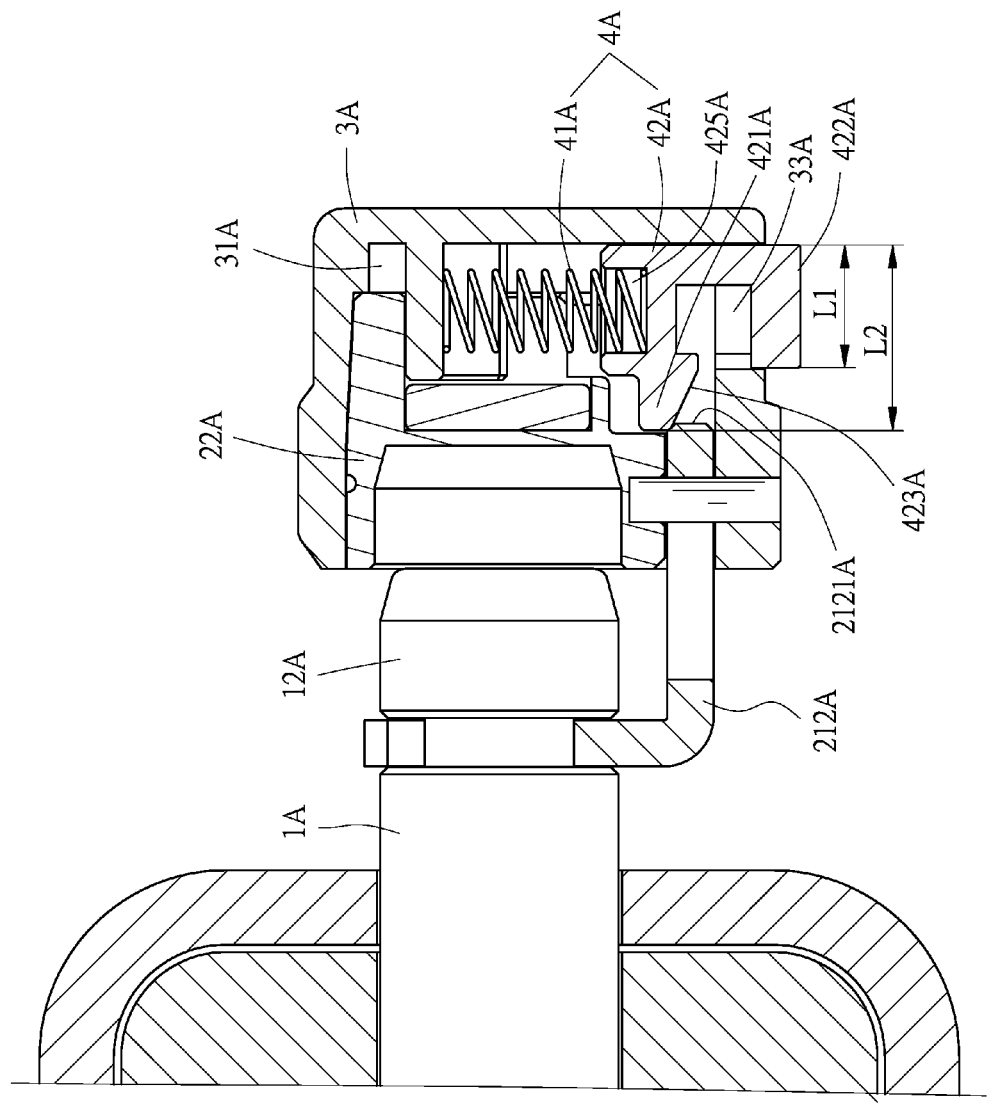
FIG. 9 is a sectional view showing another state of use of the second embodiment of the present invention.

More specifically, referring to FIG. 9, the pushing portion 422A has a first extension length L1, which is less than or equal to the diameter of the through hole 33A, and the engaging portion 421A has a second extension length L2, which is greater than the diameter of the through hole 33A to prevent the engaging member 42A from falling out of the housing 3A. Preferably, the elastic member 41A is a spring, the engaging member 42A has a groove 425A, and the spring has one end fitted in the groove 425A to ensure that the elastic member 41A is securely positioned.

Figure 10:
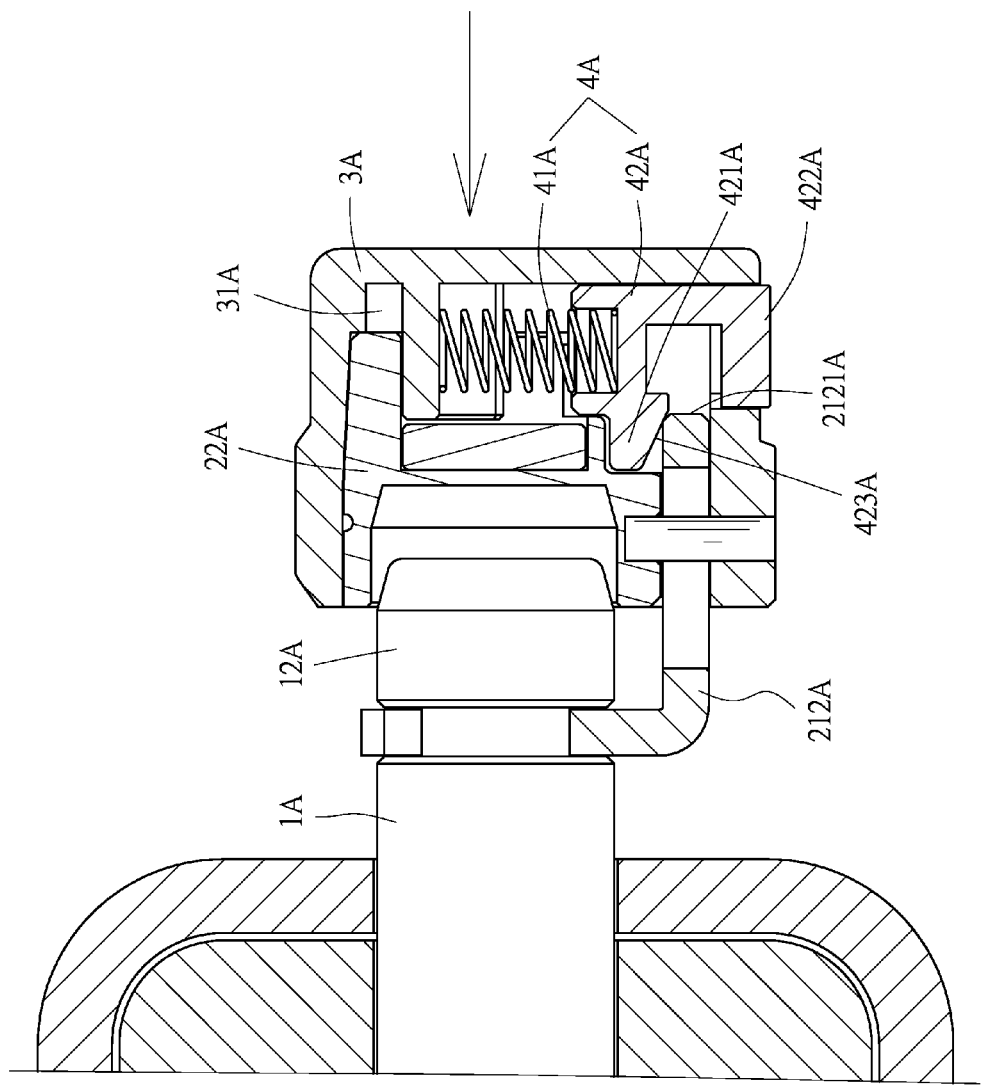
FIG. 10 is a sectional view showing yet another state of use of the second embodiment of the present invention.
Figure 11:
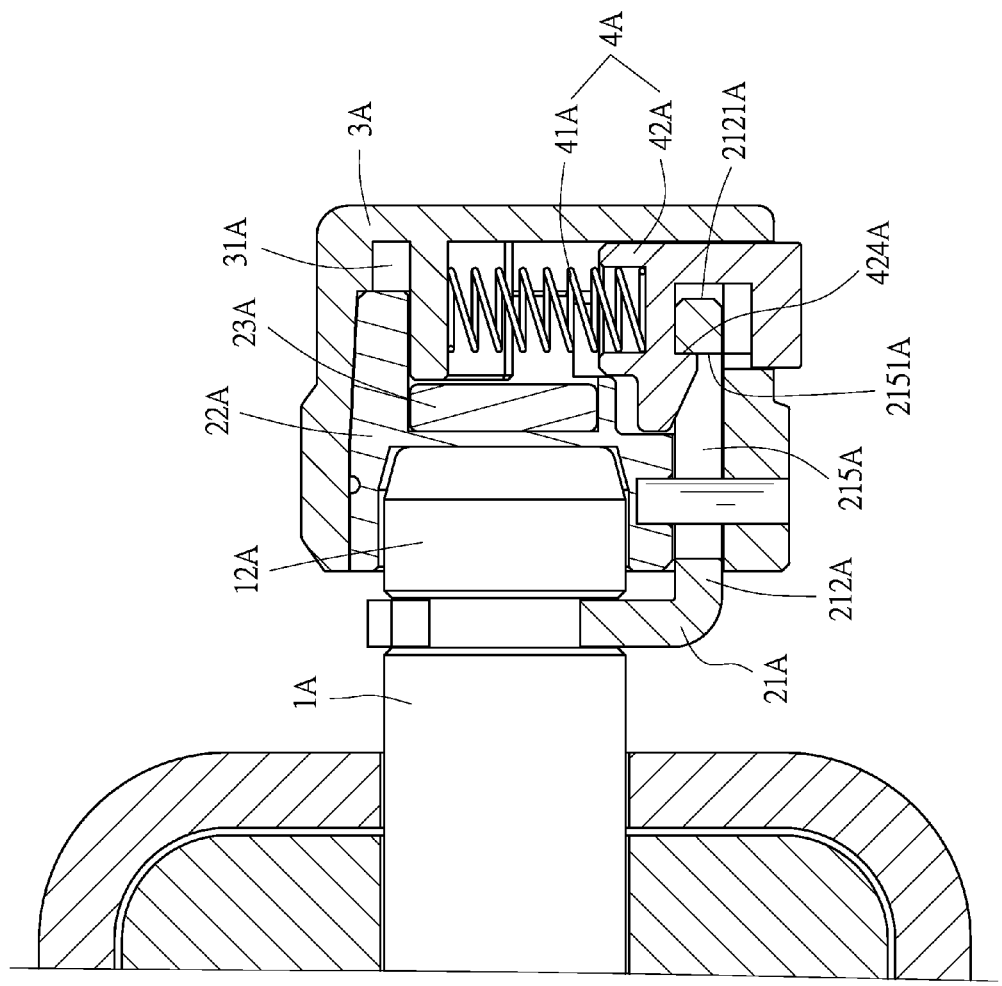
FIG. 11 is a sectional view showing still another state of use of the second embodiment of the present invention.

The lock in the second embodiment is used in generally the same way as its counterpart in the first embodiment, one major difference being that, referring to FIG. 9 and FIG. 10, when the second position-limiting member 22A is displaced toward an end portion 12A of the latching member 1A and thus presses the guide surface 423A of the engaging member 42A against the end surface 2121A of the extension portion 212A of the first position-limiting member 21A, the engaging portion 421A of the engaging member 42A is pushed by the end surface 2121A of the extension portion 212A and in turn compresses the elastic member 41A. After the guide surface 423A of the engaging member 42A moves past the end surface 2121A of the extension portion 212A, referring to FIG. 11, the stop surface 424A enters a slide groove 215A of the extension portion 212A and ends up facing a stop edge 2151A adjacent to the slide groove 215A. Thus, the second position-limiting member 22A is fixed at an engaged position not only because of the magnetic member 23A, which secures the second position-limiting member 22A to the end portion 12A of the latching member 1A by magnetic attraction, but also because of the engaging member 42A engaged in the slide groove 215A of the first position-limiting member 21A.

To disengage, referring again to FIG. 11, the pushing portion 422A of the engaging member 42A is pushed until the engaging portion 421A of the engaging member 42A is moved away from the slide groove 215A of the first position-limiting member 21A. Then, the second position-limiting member 22A is pushed in the opposite direction. Once the pushing force overcomes the magnetic attraction of the magnetic member 23A, the second position-limiting member 22A can be displaced to a disengaged position, where the second position-limiting member 22A is separate from the end portion 12A of the latching member 1A. Since the first position-limiting member 21A is fixed in position only when the second position-limiting member 22A is secured to the latching member 1A, disengagement of the second position-limiting member 22A from the end portion 12A of the latching member 1A makes it possible to detach the first position-limiting member 21A from the latching member 1A.

The foregoing description of the two embodiments should be able to enable a person of ordinary skill in the art to fully understand the operation, use, and effects of the present invention. However, the embodiments described above are only some preferred ones of the invention and should not be construed as limiting the scope of the invention. All simple equivalent changes and modification based on the appended claims and the disclosure of the specification should fall within the scope of the present invention.

What is claimed is:
1. A lock for securing a trailer hitch, comprising:
a latching member to be passed through the trailer hitch, the latching member having an end portion and a fitting groove in the end portion;
a position-limiting assembly comprising a first position-limiting member, a second position-limiting member, a magnetic member, and a securing pin, the first position-limiting member being configured to prevent the latching member from separating from the trailer hitch, the first position-limiting member having a fitting portion and an extension portion, the fitting portion defining a fitting space and an opening in communication with the fitting space in order for the fitting groove of the latching member to be placed into the fitting space of the first position-limiting member through the opening, thereby bringing the latching member and the first position-limiting member into detachable engagement, the extension portion having a slide groove, the second position-limiting member having an end defining an accommodating space, the accommodating space corresponding to the end portion of the latching member, the second position-limiting member having an opposite end defining a receiving groove, the magnetic member being mounted in the receiving groove, the second position-limiting member being slidably connected to the slide groove of the first position-limiting member by the securing pin in order to be moved to an engaged position and a disengaged position, wherein when at the engaged position, the second position-limiting member is secured to the latching member by the magnetic member such that the first position-limiting member is fixed in position and the end portion of the latching member is enclosed in the accommodating space of the second position-limiting member, and when the second position-limiting member is at the disengaged position, the end portion of the latching member is separate from the accommodating space of the second position-limiting member to allow detachment of the first position-limiting member from the latching member; and a housing defining a receiving space for receiving the second position-limiting member, the housing being connected to the second position-limiting member by the securing pin.

2. The lock of claim 1, wherein the housing has a projecting portion, and the projecting portion is located in the receiving space and is configured to be pressed against the magnetic member.

3. A lock for securing a trailer hitch, comprising:
a latching member to be passed through the trailer hitch, the latching member having an end portion and a fitting groove in the end portion;
a position-limiting assembly comprising a first position-limiting member, a second position-limiting member, a magnetic member, and a securing pin, the first position-limiting member being configured to prevent the latching member from separating from the trailer hitch, the first position-limiting member having a fitting portion and an extension portion, the fitting portion defining a fitting space and an opening in communication with the fitting space in order for the fitting groove of the latching member to be placed into the fitting space of the first position-limiting member through the opening, thereby bringing the latching member and the first position-limiting member into detachable engagement, the extension portion having a slide groove and a stop edge adjacent to the slide groove, the second position-limiting member having an end defining an accommodating space, the accommodating space corresponding to the end portion of the latching member, the second position-limiting member having an opposite end defining a receiving groove, the magnetic member being mounted in the receiving groove, the second position-limiting member being slidably connected to the slide groove of the first position-limiting member by the securing pin in order to be moved via the securing pin along the slide groove to an engaged position and a disengaged position, wherein when at the engaged position, the second position-limiting member is secured to the latching member by the magnetic member such that the first position-limiting member is fixed in position and the end portion of the latching member is enclosed in the accommodating space of the second position-limiting member, and when the second position-limiting member is at the disengaged position, the end portion of the latching member is separate from the accommodating space of the second position-limiting member to allow detachment of the first position-limiting member from the latching member;
a housing defining a receiving space for receiving the second position-limiting member, the housing being connected to the second position-limiting member by the securing pin; and
a pressing assembly mounted in the receiving space of the housing, the pressing assembly including an elastic member and an engaging member, the elastic member being compressed between the housing and the engaging member, the engaging member including an engaging portion, the engaging portion having a guide surface and a stop surface, the guide surface corresponding to an end surface of the extension portion of the first position-limiting member, the stop surface facing away from the guide surface, wherein while the second position-limiting member is moved to the engaged position, the guide surface of the engaging member moves past the end surface of the extension portion, and subsequently the stop surface of the engaging member enters the slide groove and faces the stop edge, with the elastic member applying an elastic force to the engaging member, the elastic force causing the engaging member to engage with the first position-limiting member, thereby securing the second position-limiting member at the engaged position, and when the engaging member overcomes the elastic force and separates from the first position-limiting member, the second position-limiting member is allowed to move from the engaged position to the disengaged position.

4. The lock of claim 3, wherein the housing has a projecting portion, and the projecting portion is located in the receiving space and is configured to be pressed against the magnetic member.

5. The lock of claim 3, wherein the housing has a through hole in communication with the receiving space, the engaging member including a pushing portion jutting out of the through hole of the housing, the pushing portion has a first extension length less than or equal to a diameter of the through hole, and the engaging member has a second extension length greater than the diameter of the through hole.

6. The lock of claim 3, wherein the elastic member is a spring, the engaging member has a groove, and the spring has an end mounted in the groove.

* * * * *